United States Patent [19]

Neefe

[11] Patent Number: 4,738,520

[45] Date of Patent: * Apr. 19, 1988

[54] EYE COLOR CHANGE CONTACT LENS

[76] Inventor: Charles W. Neefe, P.O. Box 429, Big Spring, Tex. 79720

[*] Notice: The portion of the term of this patent subsequent to Oct. 7, 2003 has been disclaimed.

[21] Appl. No.: 869,583

[22] Filed: Jun. 2, 1986

Related U.S. Application Data

[63] Continuation-in-part of Ser. No. 832,381, Feb. 24, 1986, abandoned.

[51] Int. Cl.⁴ .................................................. G02C 7/04
[52] U.S. Cl. ................................. 351/162; 351/160 H
[58] Field of Search ............... 351/160 R, 160 H, 161, 351/162, 177

[56] References Cited

U.S. PATENT DOCUMENTS 4,558,931 12/1985 Fuhrman ........................ 351/162 X
4,615,593 10/1986 Neefe .................................. 351/162

*Primary Examiner*—Bruce Y. Arnold
*Assistant Examiner*—Scott J. Sugarman

[57] ABSTRACT

The invention is a cosmetic contact lens that changes the apparent color of the eye. The cosmetic lens is made from a cosmetic contact lens blank comprising a colored transparent polymer disk having a cone shaped central segment. A liquid lens monomer containing a dye which visibily fluoresces by the light of day is cast over the cone shaped central segment. The daylight fluorescent monomer is polymerized to form a daylight fluorescent polymer. A clear liquid lens monomer is cast on the flat surface of the daylight fluorescent polymer and polymerized to form a solid monolithic cosmetic lens blank. A concave contact lens curve is cut through the clear polymer layer and through the daylight fluorescent colored layer and into the cone shaped colored transparent layer. The size of the lens pupil and iris area is controlled by the depth the concave contact lens surface is cut into the central cone shaped transparent blank segment. A convex contact lens curve which intersects the three blank layers is cut to form the cosmetic contact lens. The cosmetic lens has a transparent colored pupil area surrounded by the daylight fluorescent iris area that changes the apparent color of the eye and is surrounded by a clear transparent peripheral area.

14 Claims, 1 Drawing Sheet

EYE COLOR CHANGE CONTACT LENS

CROSS REFERENCE TO RELATED APPLICATIONS

This is a continuation-in-part of application Ser. No. 832,381 entitled "EYE COLOR CHANGE CONTACT LENS BLANK" filed 02/24/86, now abandoned, by Charles W. Neefe.

BACKGROUND OF THE INVENTION

The desire to change and enhance the apparent color of the eye was recorded by the Egyptians five thousand years ago. Cosmetic makeup for the eye area accounts for the larger percentage of the cosmetic sales today.

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. (U.S. Pat. No. 3,454,332-Siegel).

A third generation of colored lenses provided a thin layer of colored opaque markings placed in a clear material. The opaque colored markings radiated from the center of the clear material in a geometric pattern.

U.S. Pat. Nos. Neefe 4,460,523 and 4,472,327 describe methods of making cosmetic contact lenses wherein the lens segments are joined vertically through the lens.

SUMMARY OF THE INVENTION

The present invention is a cosmetic contact lens made from a three layered cosmetic contact lens blank. The three segments are laminated together by polymerizing the layers horizontally one upon the other. The interface between the three layers is a flat plane or cone. A cosmetic lens having a concave curvature which intersects all three layers of the blank is cut from the cosmetic blank.

The size of the central pupil and the iris area of the lens is controlled by the depth the concave surface is cut into the blank. A blank cut to a thin center thickness will have a larger pupil and iris area than a blank cut to thicker center thickness.

The addition of daylight fluorescent colorants, which fluoresce visibily in the light of day, to the ocular cosmetic lens adds a new and striking appearance to the eye not previously known.

Daylight fluorescent colorants are transparent organic dyes which are capable of visibily fluorescing in the sunlight while in a solid state solution.

Certain substances, especially a number of organic dyes, have the property of fluorescing under visible light at the blue and green end of the visible spectrum. Ultraviolet light is not required. The fluorescence of these organic dyes is associated with the individual dye molecules; in order for them to fluoresce efficiently, they must be dissolved in fairly low concentrations in a solvent for the dyes. Due to the nature of the dyes used, it is necessary to have an organic medium or carrier to put them into solution. The type of material which meets the requirements for a carrier matrix for the dyes is an organic hydrophilic resin.

The physical structure of the fluorescent colorants is amorphous, or non-crystalline. In contrast to most other colorants, they are not formed by precipitation and do not consist of particle agglomerates.

Daylight fluorescent colorants are stable to indoor light or conditions of outdoor light other than extended exposure to direct sunlight.

It is possible to mix more than one fluorescent colorant and non-fluorescent colorants in the same formula, to obtain intermediate hues.

Daylight fluorescence is greatly increased when the fluorescent colorant is in a hydrophilic matrix. Water in the hydrophilic material increases the fluorescence up to 300 percent. Water blocks infrared and transmits the green and blue wavelength which activate the fluorescent material. The water is in physical contact with the dye molecules and the hydrophilic lens material, thus increasing the light transmission efficiency to and from the lens.

The ability to fluoresce visibily under bright daylight conditions and radiates colored light which emanates from within the lens provides a color enhancement of the eye not previously known or possible.

DESCRIPTION OF THE PREFERRED EMBODIMENT

Figure 1:
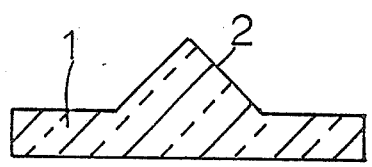
FIG. 1 shows a circular disk shaped lens blank with a central truncated cone.
Figure 2:
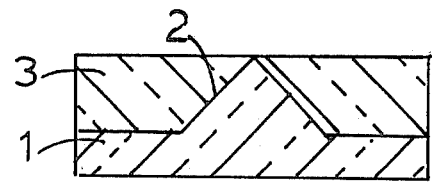
FIG. 2 shows a monomer having a fluorescent colorant cast over the truncated cone.
Figure 3:
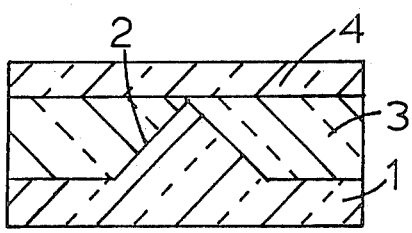
FIG. 3 shows a clear layer cast over the fluorescent layer.

A liquid lens monomer either a transparent color or clear is allowed to polymerize to form a circular disk shaped lens blank 1 FIG. 1. A smooth centrally located cone shaped surface 2 FIG. 1 is prepared. A second lens monomer having a daylight fluorescent colorant dispersed in the liquid and cast over the first polymer 1 FIG. 2 and allowed to polymerize on the prepared cone surface 2 FIG. 2 to form a solid 3 FIG. 2. A second smooth flat surface is prepared on the fluorescent colored polymer 3 FIG. 2. A third clear transparent liquid lens monomer 4 FIG. 3 is cast on the prepared flat surface and allowed to polymerize forming a three layered monolithic cosmetic lens blank. Layer 1 FIG. 3 being the colored transparent pupil layer. The second layer 3 FIG. 3 being the color change iris segment layer. A third layer 4 FIG. 3 being the clear peripheral zone layer. The cosmetic lens blank is a three layered cylinder having the demarcation line of the layers parallel to the cylinders ends at right angles to the cylinders sides.

It may also be described as composed of three discs stacked one upon the other to form a three layered cylinder.

Figure 4:
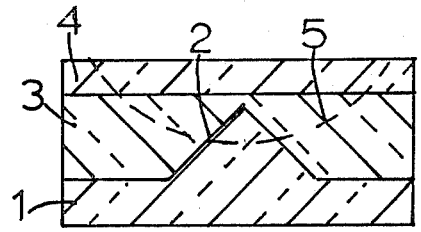
FIG. 4 shows the manner in which the concave surface of the contact lens is cut from the blank.

In order to make the cosmetic lens from the blank a concave optical surface 5 FIG. 4 is cut into the cosmetic blank and passes through the clear peripheral layer 4 FIG. 4 and the iris layer 3 FIG. 4 and into the pupil cone 2 FIG. 4.

The concave optical surface intersects the junction between the clear peripheral segment 4 FIG. 4 and the iris segment 3 FIG. 4. The concave optical surface also intersects the junction between the pupil cone 2 FIG. 4 and the iris segment 3 FIG. 4.

Figure 5:
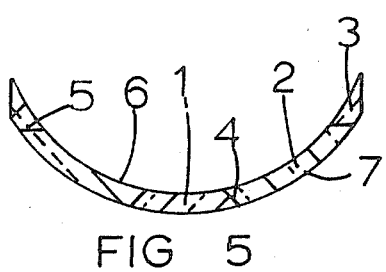
FIG. 5 shows the manner in which the convex surface of the contact lens is cut from the blank.
Figure 6:
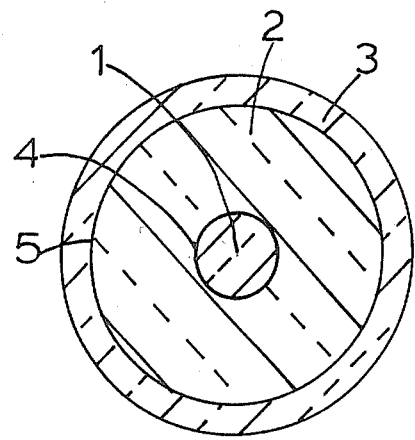
FIG. 6 shows the completed contact lens in section.

To complete the lens a second convex optical surface 7 FIG. 5 is cut. The completed lens is shown in section in FIG. 5 from the front in FIG. 6. The cosmetic has a central pupil area 1 FIGS. 5 and 6 and a junction 4 FIGS. 5 and 6 with the iris area 2 FIGS. 5 and 6 and a junction 5 FIGS. 5 and 6 with the clear peripheral area 3 FIGS. 5 and 6. As can be seen if FIG. 5 of the drawing, the junctions 5 and 6 do not pass vertically through the lens but passes through the lens on a horizontal plane 5 FIG. 5 and on a cone segment 4 FIG. 5.

The advantage of this design enables a lens having a large iris and pupil to be made by cutting the concave curve 5 FIG. 4 deeper into the cosmetic lens blank. Cutting the concave lens surface shallower into the cosmetic lens blank will provid a lens having a smaller pupil and iris area. The cone 2 FIG. 3 will enlarge the pupil size as the concave surface 5 FIG. 4 is cut deeper into the blank. The iris size will also increase as the concave surface 5 FIG. 4 is cut deeper into the cosmetic lens blank. A choice of iris and pupil size is thus provided. Both hard and soft contact lens have been made by the method.

The pupil layer 1 FIG. 3 is made of a transparent colored material.

The color change layer 3 FIG. 3 has a daylight fluorescent dye dissolved in the solid polymer.

The peripheral layer 4 FIG. 3 is made of a clear colorless material.

The order of casting the three blank segment may be reversed. The clear peripheral segment 4 FIG. 3 may be cast first and the central pupil cone layer 1 FIG. 3 cast last.

It is understood that the invention is not limited to the exact details of construction shown and described herein for obvious modifications will occur to persons skilled in the art.

I claim:

1. A cosmetic contact lens that changes the apparent color of the eye made from a cosmetic contact lens blank comprising a colored transparent polymer disk having a cone-shaped central segment wherein: a liquid lens monomer having a dye which visibily fluoresces by the light of day is cast over the cone-shaped central segment; the daylight fluorescent monomer is polymerized to form a daylight fluorescent polymer; a flat surface is prepared on the solid daylight fluorescent polymer; a clear liquid lens monomer is cast on the flat surface of the daylight fluorescent polymer and polymerized to form a solid monolithic cosmetic lens blank; a concave contact lens curve is cut through the clear polymer layer and through the daylight fluorescent colored layer and into the cone-shaped colored transparent layer; a convex contact lens curve which intersects the three blank layers is cut to form the cosmetic contact lens having a transparent colored pupil area surrounded by the daylight fluorescent iris area that changes the apparent color of the eye; and the iris area is surrounded by a clear transparent peripheral area.

2. The subject matter of claim 1 wherein the cosmetic lens is a hard lens.

3. The subject matter of claim 1 wherein the cosmetic lens is a soft lens.

4. A cosmetic contact lens as in claim 1 wherein a fluorescent and non-fluorescent colorant is present.

5. A cosmetic contact lens as in claim 1 wherein the size of the lens pupil and iris area are larger when the concave contact lens curvature is cut deeper into the cosmetic lens blank.

6. The subject matter of claim 1 wherein the lens pupil and iris area are smaller when the concave contact lens curve is cut shallower into the cosmetic lens blank.

7. The subject matter of claim 1 wherein fluorescent or non-fluorescent colorants are added to the lens.

8. A cosmetic contact lens wherein the size of the lens pupil area is controlled by the depth the concave lens surface is cut into the cosmetic lens blank by providing a cosmetic lens blank having a transparent layer with a central cone-shaped segment covered by a fluorescent layer that visibily fluoresces in the light of day, wherein the size of the lens pupil area is controlled by the depth the concave contact lens surface is cut into the central cone-shaped transparent blank segment.

9. The subject matter of claim 8 wherein the cosmetic lens is a hard lens.

10. The subject matter of claim 8 wherein the cosmetic lens is a soft lens.

11. A cosmetic contact lens as in claim 8 wherein a fluorescent and non-fluorescent colorant is present.

12. A cosmetic contact lens as in claim 8 wherein the size of the lens pupil and iris area is larger when the concave contact lens curvature is cut deeper into the cosmetic lens blank.

13. The subject matter of claim 8 wherein the lens pupil and iris area are smaller when the concave contact lens curve is cut shallower into the cosmetic lens blank.

14. The subject matter of claim 8 wherein fluorescent or non-fluorescent colorants are added to the lens.

* * * * *